US011953178B2

(12) United States Patent
Huang et al.

(10) Patent No.: US 11,953,178 B2
(45) Date of Patent: Apr. 9, 2024

(54) DOWNLIGHT APPARATUS

(71) Applicant: XIAMEN ECO LIGHTING CO. LTD., Xiamen (CN)

(72) Inventors: Huiyong Huang, Xiamen (CN); Zhenyu Tang, Xiamen (CN); Shuxing Gao, Xiamen (CN)

(73) Assignees: ONEWAVE TECHNOLOGY CO., LTD., Taipei (TW); Yun-Chan Tsai, Taipei (TW)

( * ) Notice: Subject to any disclaimer, the term of this patent is extended or adjusted under 35 U.S.C. 154(b) by 0 days.

(21) Appl. No.: 18/197,484

(22) Filed: May 15, 2023

(65) Prior Publication Data

US 2023/0280007 A1 Sep. 7, 2023

Related U.S. Application Data

(63) Continuation of application No. 17/954,595, filed on Sep. 28, 2022, now Pat. No. 11,686,442, which is a continuation of application No. 17/465,518, filed on Sep. 2, 2021, now Pat. No. 11,486,554.

(30) Foreign Application Priority Data

Nov. 21, 2020 (CN) ......................... 202022750222.9

(51) Int. Cl.

| | |
|---|---|
| ***F21S 8/00*** | (2006.01) |
| ***F21S 8/02*** | (2006.01) |
| ***F21V 21/04*** | (2006.01) |
| *F21Y 115/10* | (2016.01) |

(52) U.S. Cl.
CPC .............. *F21S 8/026* (2013.01); *F21V 21/04* (2013.01); *F21Y 2115/10* (2016.08)

(58) Field of Classification Search
CPC ........ F21S 8/026; F21V 21/04; F21Y 2115/10
See application file for complete search history.

(56) References Cited

U.S. PATENT DOCUMENTS

2015/0211699 A1* 7/2015 McMillan ............ F21V 21/047 362/147

* cited by examiner

*Primary Examiner* — Gerald J Sufleta, II
(74) *Attorney, Agent, or Firm* — Chun-Ming Shih; LANWAY IPR SERVICES

(57) ABSTRACT

A downlight apparatus includes a driver, a light source, a light holder, a first switch and a second switch. The driver has a power converter and a controller. The light holder is used for fixing the light source. The holder bottom of the light holder defines a light opening. The light source emits a light from the light opening. The light holder is placed in an installation cavity. The rim structure is connected to the holder bottom. The rim structure has a rim edge concealing the installation cavity. The first switch is provided for users to operate to adjust a setting. The second switch is provided for users to operate to adjust the setting. The first switch is concealed in the installation cavity. The second switch is placed on the rim edge exposed outside the installation cavity. The first switch and the second switch are coupled to the controller.

20 Claims, 5 Drawing Sheets

DOWNLIGHT APPARATUS

RELATED APPLICATION

The present application is a continued application of U.S. application Ser. No. 29/753,559, which is a continued application of U.S. application Ser. No. 17/465,518.

FIELD

The present invention is related to a downlight apparatus, and more particularly related to a downlight apparatus with a flexible setting.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. Users would like to configure settings of downlight devices. For example, users may choose light devices of different color temperatures for different needs.

However, switches of most light devices are placed on the back side of light devices. In such case, users may need to remove the light device so as to change the setting.

It is therefore beneficial to solve such problems and consider other requirements. Downlight devices are widely used in various places. Users would like to configure settings of downlight devices. For example, users may choose light devices of different color temperatures for different needs.

However, switches of most light devices are placed on the back side of light devices. In such case, users may need to remove the light device so as to change the setting.

It is therefore beneficial to solve such problems and consider other requirements. Downlight devices are widely used in various places. Users would like to configure settings of downlight devices. For example, users may choose light devices of different color temperatures for different needs.

However, switches of most light devices are placed on the back side of light devices. In such case, users may need to remove the light device so as to change the setting.

It is therefore beneficial to solve such problems and consider other requirements. Downlight devices are widely used in various places. Users would like to configure settings of downlight devices. For example, users may choose light devices of different color temperatures for different needs.

However, switches of most light devices are placed on the back side of light devices. In such case, users may need to remove the light device so as to change the setting.

It is therefore beneficial to solve such problems and consider other requirements.

SUMMARY

In some embodiments, a downlight apparatus includes a driver, a light source, a light holder, a first switch and a second switch.

The driver has a power converter and a controller.

The light holder is used for fixing the light source.

The holder bottom of the light holder defines a light opening.

The light source emits a light from the light opening.

The light holder is placed in an installation cavity.

The rim structure is connected to the holder bottom.

The rim structure has a rim edge concealing the installation cavity.

The first switch is provided for users to operate to adjust a setting.

The second switch is provided for users to operate to adjust the setting.

The first switch is concealed in the installation cavity.

The second switch is placed on the rim edge exposed outside the installation cavity.

The first switch and the second switch are coupled to the controller.

In some embodiments, the second switch is coupled to the driver via a switch conductive path.

The second switch is enabled when the driver supplies electricity to the second switch.

The first switch is operable to change a status even the first switch does not receive electricity from the driver.

In some embodiments, the second switch is a touch switch.

In some embodiments, the touch switch receives different gestures corresponding to different operations on the setting.

In some embodiments, the light source is triggered to generate a light pattern corresponding to the gesture on the touch switch.

In some embodiments, the setting set by the first switch is overwritten according to an operation of the second switch.

In some embodiments, the light source includes multiple types of LED modules with different color temperatures.

The setting is corresponding to a mixed color temperature by the multiple tyeps of LED modules.

In some embodiments, the downlight apparatus may also include a driver box.

The driver box is used for containing the power converter.

The driver box is attached to an exterior side of the light holder.

In some embodiments, the first switch is attached to a wall of the driver box.

In some embodiments, the downlight apparatus may also include a third switch.

The third switch is used for setting a limiting light intensity of the light source.

The limiting light intensity is chosen as a continuous value lower than a maximum light intensity of the light source.

The driver controls the light source less than the limiting light intensity.

In some embodiments, the driver box has multiple frames folded as a polygonal box.

In some embodiments, the light holder has a trumpet unit.

The trumpet unit has a light entrance end and a light exit end.

A first diameter of the light entrance end is smaller than a second diameter of the light exit end.

In some embodiments, an inner surface of the trumpet unit has multiple ladders arranged in parallel.

In some embodiments, an inner surface of the trumpet unit has multiple protruding rings.

In some embodiments, a light passing cover is fixed to the light entrance of the trumpet unit.

In some embodiments, a reflective cup has a first end connecting to the light source, and the reflective cup has a second end connecting to the light passing cover.

In some embodiments, the conductive path extends along an exterior surface of the light holder to couple the second switch.

In some embodiments, the rim edge has an switch container for inserting the second switch.

In some embodiments, a rim light source is placed on the rim edge.

In some embodiments, the rim light source and the second switch are integrated as a module to be plugged to the rim edge.

DETAILED DESCRIPTION

Figure 3:
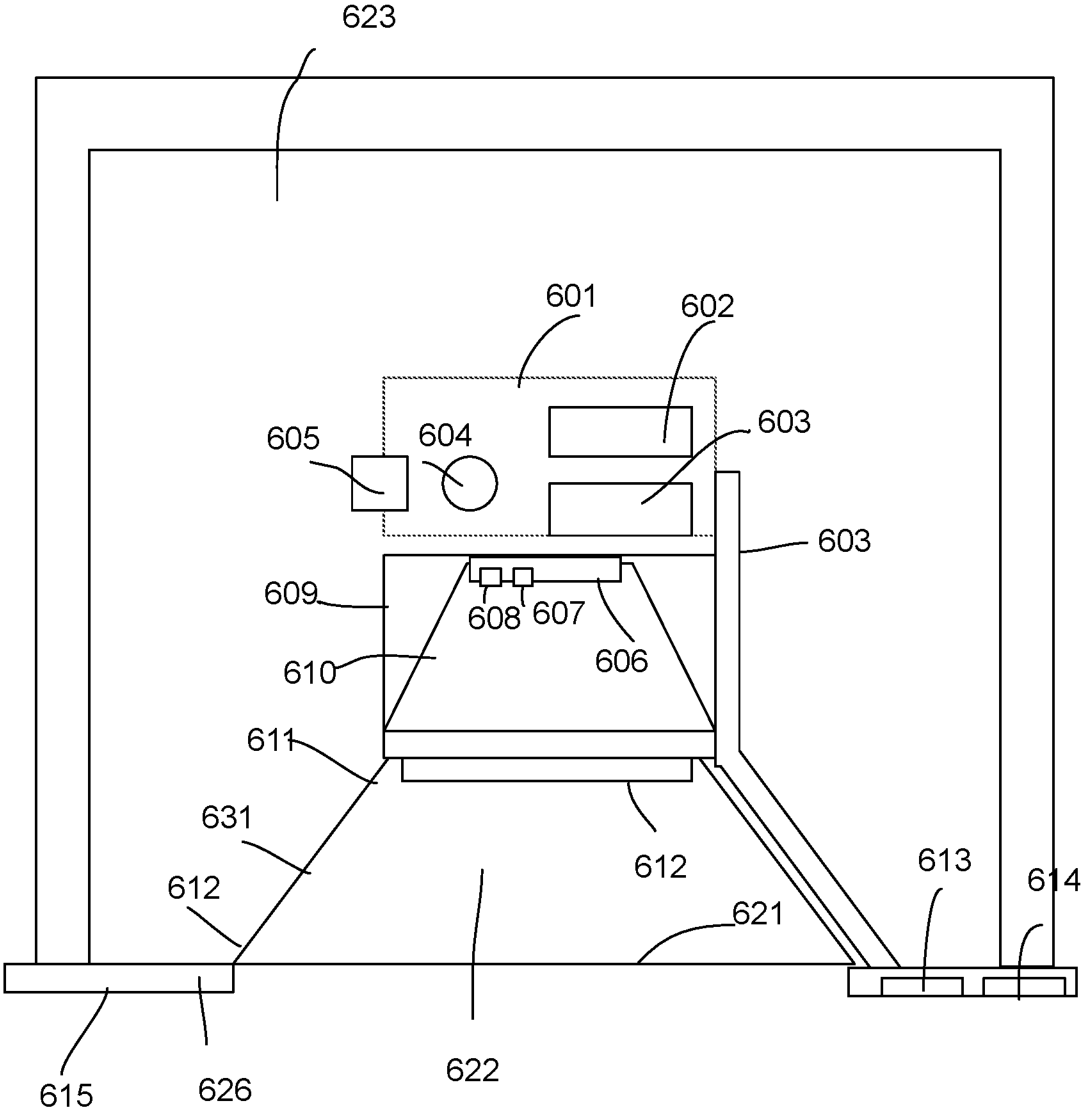
FIG. 3 illustrates another downlight apparatus.

In FIG. 3, a downlight apparatus includes a driver, a light source 606, a light holder 609, a first switch 605 and a second switch 613.

The driver has a power converter 602 and a controller 603.

The light holder 609 is used for fixing the light source 606.

The holder bottom 621 of the light holder 609 defines a light opening 622.

The light source 606 emits a light from the light opening 622.

The light holder 609 is placed in an installation cavity 623.

The rim structure 615 is connected to the holder bottom 621.

The rim structure 615 has a rim edge 626 concealing the installation cavity 623.

The first switch 605 is provided for users to operate to adjust a setting. For example, the setting refers a working mode, a light intensity, a color temperature, a scenario or any parameter.

The second switch 613 is provided for users to operate to adjust the setting. In some embodiments, the first switch 605 and the second switch 613 are used to configure the same setting, e.g. a working mode, a light intensity, a color temperature, a scenario or any parameter. In other words, users may use either the first switch 605 and the second switch 613 to set the same setting. The first switch 605 is located inside the installation cavity 623, e.g. a cavity in the ceiling. The second switch 613 is located outside the installation cavity 623. In other words, when the downlight apparatus is installed, the first switch 605 is hidden in the installation cavity 623. Users may operate the second switch 613 to adjust the same setting that is originally set by the first switch 605.

The first switch 605 is concealed in the installation cavity 623.

The second switch 613 is placed on the rim edge 626 exposed outside the installation cavity 623.

The first switch 605 and the second switch 613 are coupled to the controller 603.

In some embodiments, the second switch 613 is coupled to the driver via a switch conductive path 603. The switch conductive path 603 may include a tube for inserting a wire, and the tube may be attached on surface of the light holder 609. In some other embodiments, the conductive path 603 may be a conductive path covered with insulation layer. Electrodes and sockets may be disposed for easily assembling components.

The second switch 613 is enabled when the driver supplies electricity to the second switch 613.

The first switch 605 is operable to change a status even the first switch 605 does not receive electricity from the driver. For example, the first switch 605 is a mechanic switch with multiple candidate positions for user to move a lever to one of the multiple candidate positions. Such operation remains valid even when electricity is not supplied to the first switch 605.

In some embodiments, the second switch 613 is a touch switch. The touch switch has a touch surface on the surface of the rim edge 626. When the downlight apparatus is installed on a ceiling, the touch surface faces to the ground. Users may take a ladder and operates the touch surface directly to change the setting and do not necessary detach the downlight apparatus to operate the first switch 605.

In some embodiments, the touch switch receives different gestures corresponding to different operations on the setting. For example, a user may slide the touch surface along a first direction to increase or decrease a light intensity. In a second direction of the touch surface perpendicular to the first direction, the user may slide the touch surface to change a color temperature to be mixed by the light source.

In some embodiments, the light source is triggered to generate a light pattern corresponding to the gesture on the touch switch. For example, the light intensity may be changed slightly when the user presses the touch surface for responding the pressing operation.

In some embodiments, the setting set by the first switch is overwritten according to an operation of the second switch. As mentioned above, the first switch is hidden in the installation cavity while the second switch is exposed outside the installation cavity.

In some embodiments, the light source includes multiple types of LED modules with different color temperatures.

The setting is corresponding to a mixed color temperature by the multiple tyeps of LED modules. Color temperature adjustment is an important feature requested by many users. Sometimes, the color temperature adjustment may be accompanied with light intensity change to simulate natural light changes, e.g. from sun rise light to noon sun light.

In some embodiments, the downlight apparatus may also include a driver box 601.

The driver box 601 is used for containing the power converter 602. The power converter 602 may include a rectifier, a filter, a current source and/or other components.

The driver box 601 is attached to an exterior side of the light holder 609.

In some embodiments, the first switch 605 is attached to a wall of the driver box 601.

In some embodiments, the downlight apparatus may also include a third switch 604.

The third switch 604 is used for setting a limiting light intensity of the light source 606.

The limiting light intensity is chosen as a continuous value lower than a maximum light intensity of the light source 606. For example, the driver and the light source may provide a maximum light intensity equivalent to a traditional 8 W light bulb. In past, users can just decide to turn on or turn off the light source. In this case, the 8 W light bulb light intensity is the maximum light intensity. The user may select a 2 W to 8 W light bulb light intensity as the limiting light intensity. For example, when user selects 5 W light bulb light intensity, the light source is operated to emit light equivalent to 5 W light bulb intensity, instead of the maximum light intensity 8 W light intensity. The term "continuous value" refers to any value among unlimited choices lower than the maximum light intensity, not limited to only certain discrete values like 2 W, 4 W, 6 W, 8 W.

In some embodiments, there is a wall switch connecting to the downlight apparatus to change the intensity of the downlight apparatus. When 100% light intensity is selected by the wall switch, 100% of the limiting light intensity, instead of the maximum light intensity, is selected to be produced. When 80% light intensity is selected by the wall switch, 80% of the limiting light intensity is selected to be produced.

The driver controls the light source less than the limiting light intensity.

Figure 1:
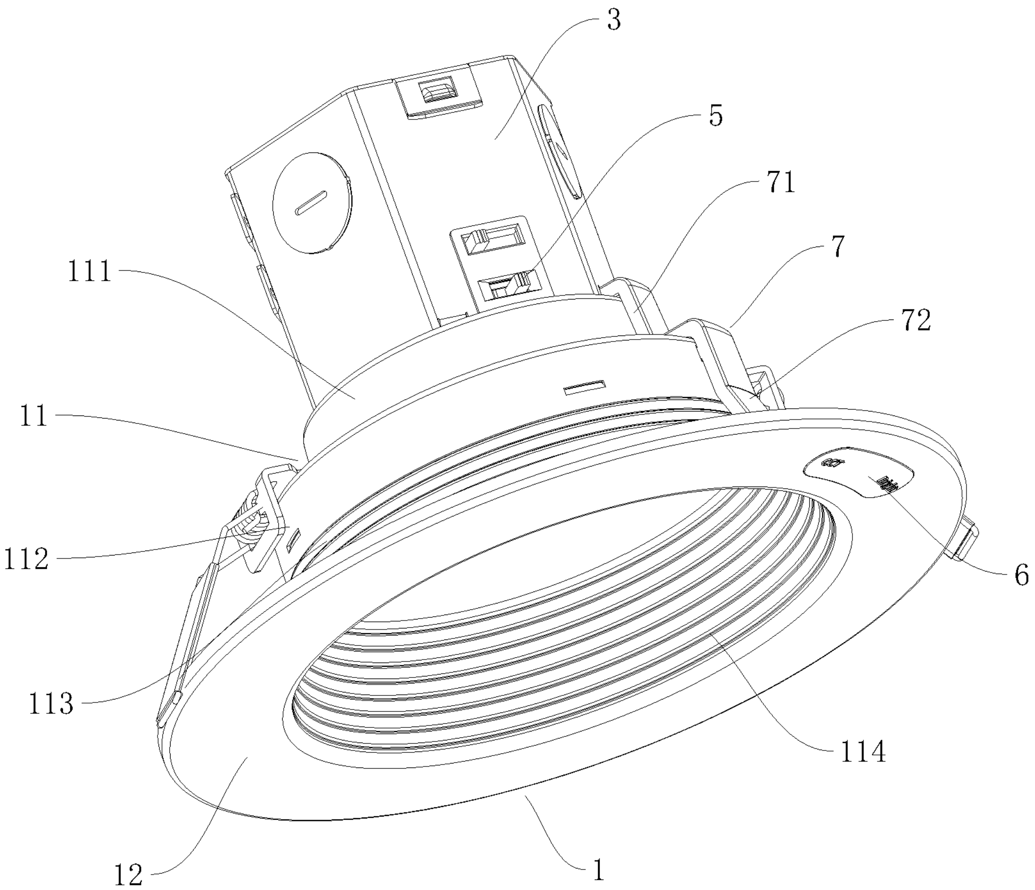
FIG. 1 illustrates a downlight apparatus embodiment.

In FIG. 1, the driver box 3 has multiple frames folded as a polygonal box.

In FIG. 3, the light holder has a trumpet unit 631.

The trumpet unit 631 has a light entrance end 611 and a light exit end 612.

A first diameter of the light entrance end 611 is smaller than a second diameter of the light exit end 612.

Figure 5:
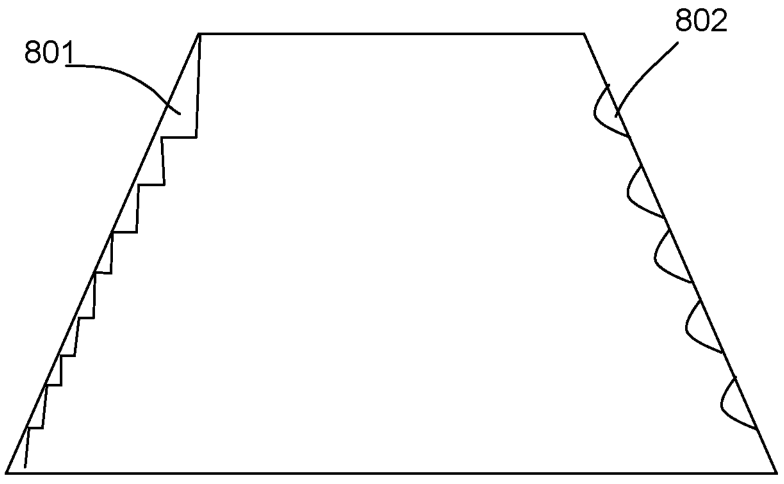
FIG. 5 illustrates a trumpet unit example.

In FIG. 5, an inner surface of the trumpet unit has multiple ladders 801 arranged in parallel.

In FIG. 5, an inner surface of the trumpet unit has multiple protruding rings 802.

In FIG. 3, a light passing cover 612 is fixed to the light entrance 611 of the trumpet unit 631.

In some embodiments, a reflective cup 610 has a first end connecting to the light source 601, and the reflective cup 610 has a second end connecting to the light passing cover 612.

In some embodiments, the conductive path 603 extends along an exterior surface of the light holder 609 to couple the second switch 613.

Figure 4:
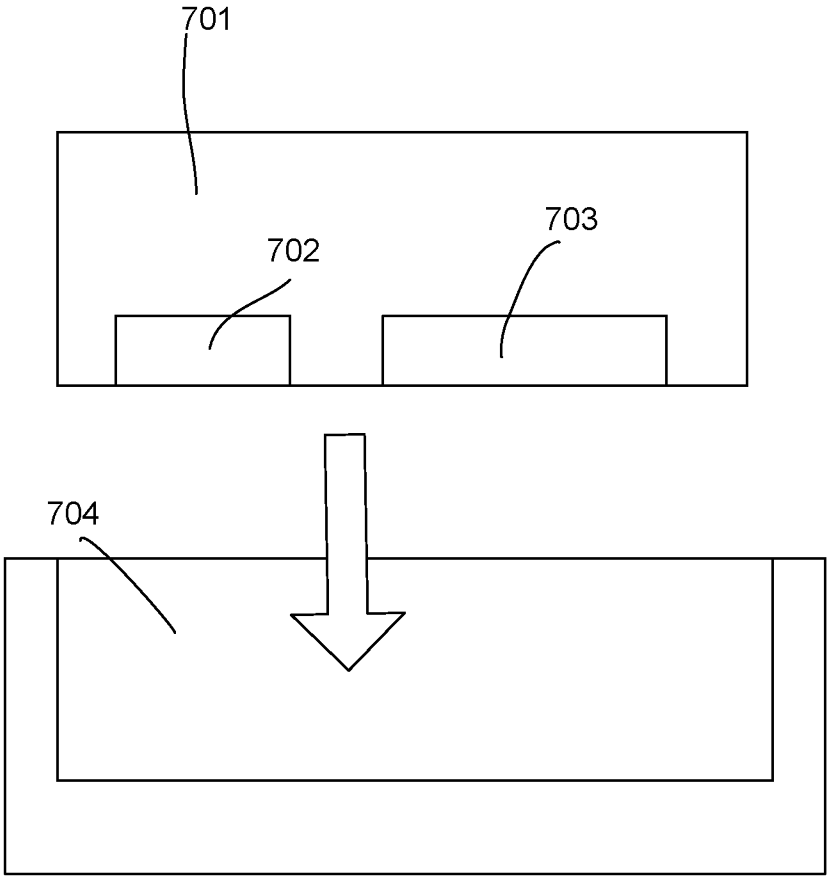
FIG. 4 illustrates a switch module.

In FIG. 4, the rim edge has a switch container 704 for inserting the second switch 702.

In FIG. 3, a rim light source 614 is placed on the rim edge 626.

In FIG. 4, the rim light source 703 and the second switch 702 are integrated as a module 701 to be plugged to the rim edge.

Please refer to FIG. 1, which shows another downlight apparatus embodiment.

In FIG. 1, the downlight apparatus 1 includes a driver box 3. There is a first switch 5 on the surface of the driver box 3. There is a conductive path 7 with a first part 71 and a second part 72. The light holder 11 has a top body 111, a middle body 112 and a trump unit 113.

The rim structure 113 has a rim edge 12. The second switch 6 is disposed on the rim edge 12. The inner surface 114 of the trumpet unit 113 has multiple protruding structures for preventing glare effect that makes eyes not comfortable.

Figure 2:
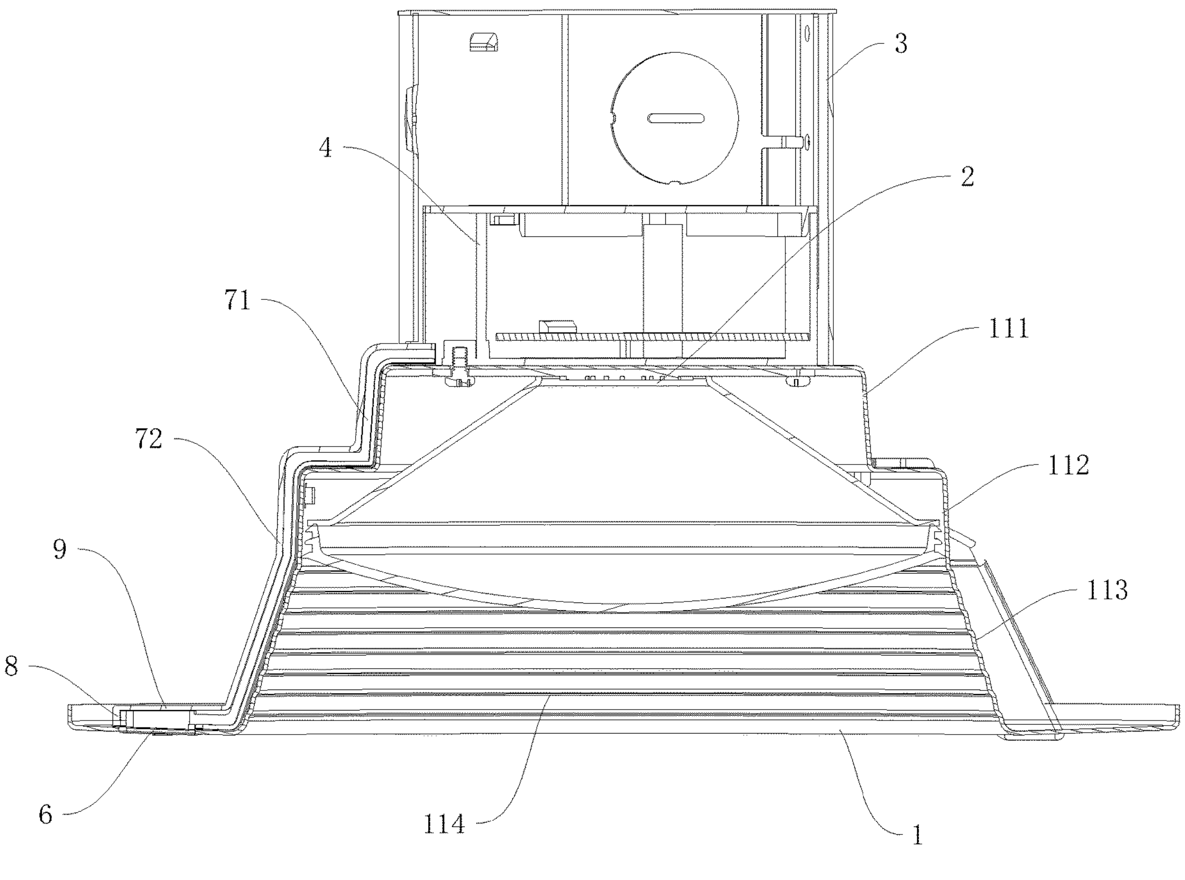
FIG. 2 illustrates a cross sectional view of the example in FIG. 1.

FIG. 2 is a cross-sectional view of the example of FIG. 1. The same reference numerals refer to the same components. In addition to the components mentioned above, the driver 4 is placed in the driver box 3.

The light source 2 is placed on the top body 111. A concealing cover 9 is used for covering a container 8 for storing the second switch 6.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a driver with a power converter and a controller;

a light source, wherein the power converter contains a current source to generate a driving current to the light source;

a light holder for fixing the light source, wherein a holder bottom of the light holder defines a light opening, wherein the light source emits a light from the light opening;

a first switch for users to operate to adjust a setting, wherein the light source comprises multiple types of LED modules with different light parameters, wherein the setting corresponds to a mixed light parameter of the multiple types of LED modules; and a second switch for users to operate to adjust the setting, wherein the first switch is concealed, wherein the second switch is placed on the light holder exposed for a user to operate, wherein the first switch and the second switch are coupled to the controller, wherein the second switch is coupled to the driver via a switch conductive path, wherein the second switch is enabled when the driver supplies electricity to the second switch, wherein the first switch is operable to change the setting even when the first switch does not receive electricity from the driver.

2. The lighting apparatus of claim 1, wherein the first switch has multiple positions to select manually by users to set the setting.

3. The lighting apparatus of claim 1, wherein the second switch is a touch switch.

4. The lighting apparatus of claim 3, wherein the touch switch receives different gestures corresponding to different operations on the setting.

5. The lighting apparatus of claim 4, wherein the light source is triggered to generate a light pattern corresponding to the gesture on the touch switch.

6. The lighting apparatus of claim 1, wherein the setting set by the first switch is overwritten according to an operation of the second switch.

7. The lighting apparatus of claim 1, further comprising a driver box, wherein the driver box is used for containing the power converter.

8. The lighting apparatus of claim 7, wherein the driver box is attached to an exterior side of the light holder.

9. The lighting apparatus of claim 7, wherein the first switch is attached to a wall of the driver box.

10. The lighting apparatus of claim 9, further comprising a third switch, wherein the third switch is used for setting a limiting light intensity of the light source, wherein the limiting light intensity is chosen as a continuous value lower than a maximum light intensity of the light source, wherein the driver controls the light source less than the limiting light intensity.

11. The lighting apparatus of claim 8, wherein the driver box has multiple frames folded as a polygonal box.

12. The lighting apparatus of claim 1, wherein the light holder has a trumpet unit, wherein the trumpet unit has a light entrance end and a light exit end, wherein a first diameter of the light entrance end is smaller than a second diameter of the light exit end.

13. The lighting apparatus of claim 12, wherein an inner surface of the trumpet unit has multiple ladders arranged in parallel.

14. The lighting apparatus of claim 12, wherein an inner surface of the trumpet unit has multiple protruding rings.

15. The lighting apparatus of claim 12, wherein a light passing cover is fixed to the light entrance of the trumpet unit.

16. The lighting apparatus of claim 15, wherein a reflective cup has a first end connecting to the light source, and the reflective cup has a second end connecting to the light passing cover.

17. The lighting apparatus of claim 1, wherein the switch conductive path extends along an exterior surface of the light holder to couple the second switch.

18. The lighting apparatus of claim 17, wherein the rim edge has a switch container for inserting the second switch.

19. The lighting apparatus of claim 1, wherein a rim light source is placed on the rim edge.

20. The lighting apparatus of claim 19, wherein the rim light source and the second switch are integrated as a module to be plugged into the rim edge.

* * * * *